(12) United States Patent
Tsengas

(10) Patent No.: US 7,325,514 B1
(45) Date of Patent: Feb. 5, 2008

(54) TOSSABLE PET TOY FOR HOLDING CONSUMABLE TREATS

(75) Inventor: Steven Tsengas, Fairport Harbor, OH (US)

(73) Assignee: Ourpet's Company, Fairport Harbor, OH (US)

( * ) Notice: Subject to any disclaimer, the term of this patent is extended or adjusted under 35 U.S.C. 154(b) by 0 days.

(21) Appl. No.: 11/223,550

(22) Filed: Sep. 9, 2005

Related U.S. Application Data

(60) Provisional application No. 60/608,459, filed on Sep. 10, 2004, provisional application No. 60/608,462, filed on Sep. 10, 2004.

(51) Int. Cl.
*A01K 29/00* (2006.01)
*A63B 65/10* (2006.01)
*A63H 27/00* (2006.01)

(52) U.S. Cl. .......................... 119/707; 119/711; 446/46; 473/588

(58) Field of Classification Search ................. 119/707, 119/709, 710, 711; 446/46; 473/588
See application file for complete search history.

(56) References Cited

U.S. PATENT DOCUMENTS

| | | | | |
|---|---|---|---|---|
| 4,722,299 A | * | 2/1988 | Mohr | 119/707 |
| 4,771,733 A | * | 9/1988 | Axelrod | 119/710 |
| 4,906,007 A | * | 3/1990 | Mitchell et al. | 473/589 |
| 5,009,193 A | * | 4/1991 | Gordon | 119/711 |
| 5,529,017 A | * | 6/1996 | Udelle et al. | 119/707 |
| 5,924,908 A | * | 7/1999 | O'Heir | 446/168 |
| 6,129,053 A | * | 10/2000 | Markham et al. | 119/710 |

* cited by examiner

*Primary Examiner*—Bret Hayes
(74) *Attorney, Agent, or Firm*—John D. Gugliotta; Mandy Seuffert

(57) ABSTRACT

A tossable pet toy is provided in either an annular or disc shape. The ring or disc comprises a perimeter having an inner rib and an outer rib, the ribs forming an interstitial space therebetween for holding a consumable pet treat. The inner rib is a single, continuous rib circumscribing the innermost portion of the ring. The outer rib is a single, continuous rib circumscribing the outermost portion of the ring. The inner rib and outer rib are concentric, with the outer rib having a greater circumferential distance than the inner rib. The interstitial space formed between the ribs is likewise a single, continuous space circumscribing the area between the ribs. The space accommodates the placement of at least one treat, and may accommodate a plurality of treats along the circumference of the ring.

5 Claims, 3 Drawing Sheets

TOSSABLE PET TOY FOR HOLDING CONSUMABLE TREATS

RELATED APPLICATIONS

The present invention contains subject matter that was first described in, and claims the benefit of, both U.S. Provisional Patent No. 60/608,459 and 60/608,462, both filed on Sep. 10, 2004 and incorporated by reference as if fully rewritten herein.

BACKGROUND OF THE INVENTION

1. Field of the Invention

The present invention relates generally to a pet toy and, more particularly, to a pet toy having an tossable form and for holding consumable treats.

2. Description of the Related Art

There are many pet toys available that provide entertainment to the pet and the owner, including pet toys that dispense treats upon rolling or movement of the toy. However, these toys provide for the insertion of the treats into cavities within the toy and for dispensing based on movement or rotation of the toy. The present invention is markedly different by providing an annular pet toy having an inner rib and an outer rib, each concentric and continuous forming a space in which at least one consumable pet treat is inserted and held until extracted by the pet. This provides exercise to the muscles, strengthens teeth and gums, and extracts harmful plaque from the teeth of a pet. These, among other disclosed advantages and features, overcome many of the deficiencies outlined and inherent within the known prior art.

Consequently, a need has been felt for providing an apparatus and method of providing a tossable pet toy capable of holding consumable pet treats.

SUMMARY OF THE INVENTION

It is therefore an object of the present invention to provide an improved pet toys having a tossable form and capable of holding consumable treats.

It is a feature of a primary embodiment of the present invention to provide a pet toy having an annular shape and holding consumable treats.

It is a feature of a secondary embodiment of the present invention to provide a pet toy having a disc or discus shape and holding consumable treats.

Briefly described according to one embodiment of the present invention, a tossable pet toy is provided in either an annular or disc shape. The ring or disc comprises an perimeter having an inner rib and an outer rib, the ribs forming an interstitial space therebetween for holding a consumable pet treat. The inner rib is a single, continuous rib circumscribing the innermost portion of the ring. The outer rib is a single, continuous rib circumscribing the outermost portion of the ring. The inner rib and outer rib are concentric, with the outer rib having a greater circumferential distance than the inner rib. The interstitial space formed between the ribs is likewise a single, continuous space circumscribing the area between the ribs. The space accommodates the placement of at least one treat, and may accommodate a plurality of treats along the circumference of the ring.

In accordance with either preferred embodiment, the toy is an effective training device for a pet, especially canines. The toy may be employed as a retrieval toy that the canine may chase, retrieve and return to the owner. Because of the ribs and interstitial space provided, consumable treats "T" (such as appropriately proportioned food, kibble or treats) may be inserted therein, thus providing an incentive and reward to retrieve and/or obey commands. By impinging the treats within the ribs and space, the pet must exert energy to retrieve the treats, exercise jaw and head muscles, using the teeth and gums, thus the exercise in extracting the treat from the toy exercises muscles of the head and neck, and strengthens teeth and gums, and removes harmful plaque from the teeth and gumlines.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1-4.

1. Detailed Description of the Figures

Figure 1:
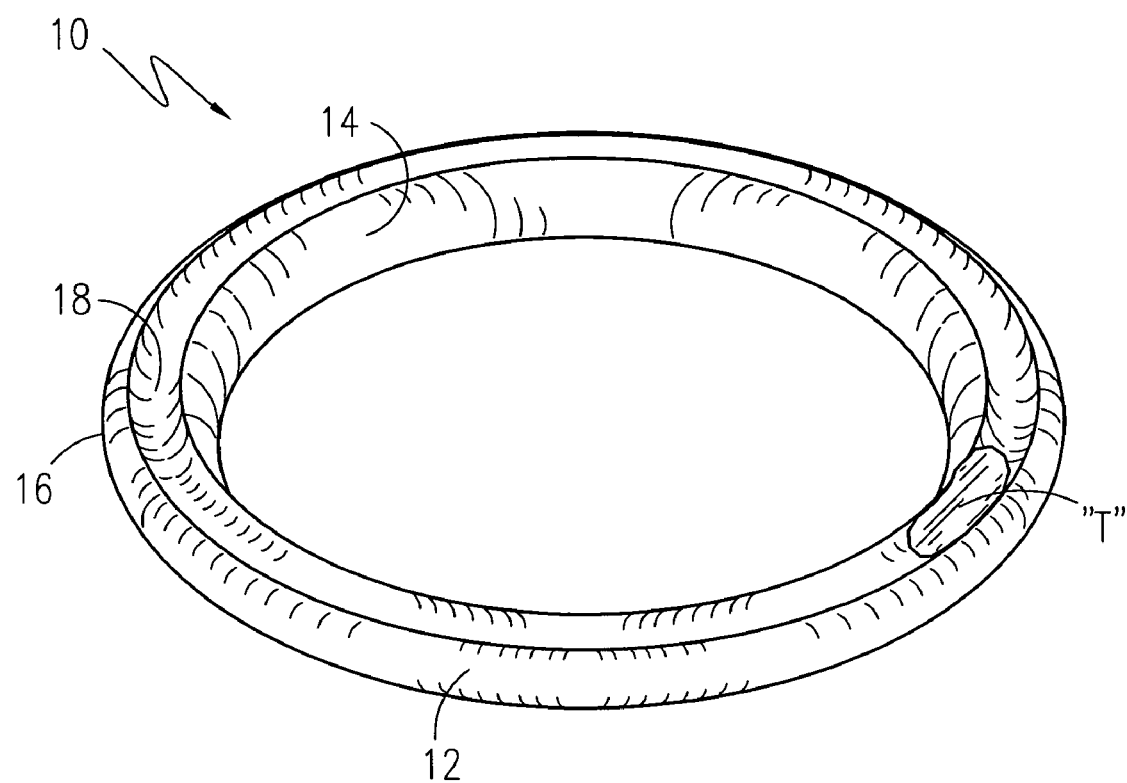
FIG. 1 is an perspective of an annular pet toy for holding consumable pet treats.

Referring now to FIG. 1, an annular pet toy for holding consumable treats 10 is depicted in accordance with a preferred embodiment of the present invention. The toy 10 comprises an annular ring 12 having an inner rib 14 and an outer rib 16, the ribs 14 and 16 forming an interstitial space 18 there between for holding a consumable pet treat "T". The inner rib 14 is a single, continuous rib circumscribing the innermost portion of the ring 12. The outer rib 16 is a single, continuous rib circumscribing the outermost portion of the ring 12. The inner rib 14 and outer rib 16 are concentric, with the outer rib 16 having a greater circumferential distance than the inner rib 14. The interstitial space 18 formed between the ribs 14 and 16 is likewise a single, continuous space circumscribing the area between the ribs 14 and 16. The space 18 accommodates the placement of at least one treat "T" and may accommodate a plurality of treats "T" along the circumference of the ring 12.

The toy 10 is preferably manufactured via molding techniques used for plastics and rubbers, from an elastomeric product (such as thermoset or thermoplastic high tear strength material, thermoplastic elastomers and/or natural rubber). It is envisioned that the toy 10 is manufactured from a material having a specific gravity less than 1.0 so that the toy 10 is buoyant in an aqueous liquid. An aroma, oil or juice may be molded with or impregnated into the material during manufacture, thereby providing olfactory stimulation to the pet. Either separately, or in combination with the consumable treat "T", the aroma, oil or juice functions as an attractant to the pet to engage in chewing, chasing and retrieving exercises.

The toy 10 is envisioned as being adaptable for manufacture directed to variously sized animals, including the various breeds of canines. Thus, the toy 10 may be manufactured in sizes for small breeds, medium size breeds and large breeds, respectively. It is envisioned that the diameters may vary in a range from four inches to twelve inches. Likewise, the toy 10 is envisioned as being manufactured in a variety of colors and/or with a variety of design configurations on the surface of the toy 10.

Figure 2:
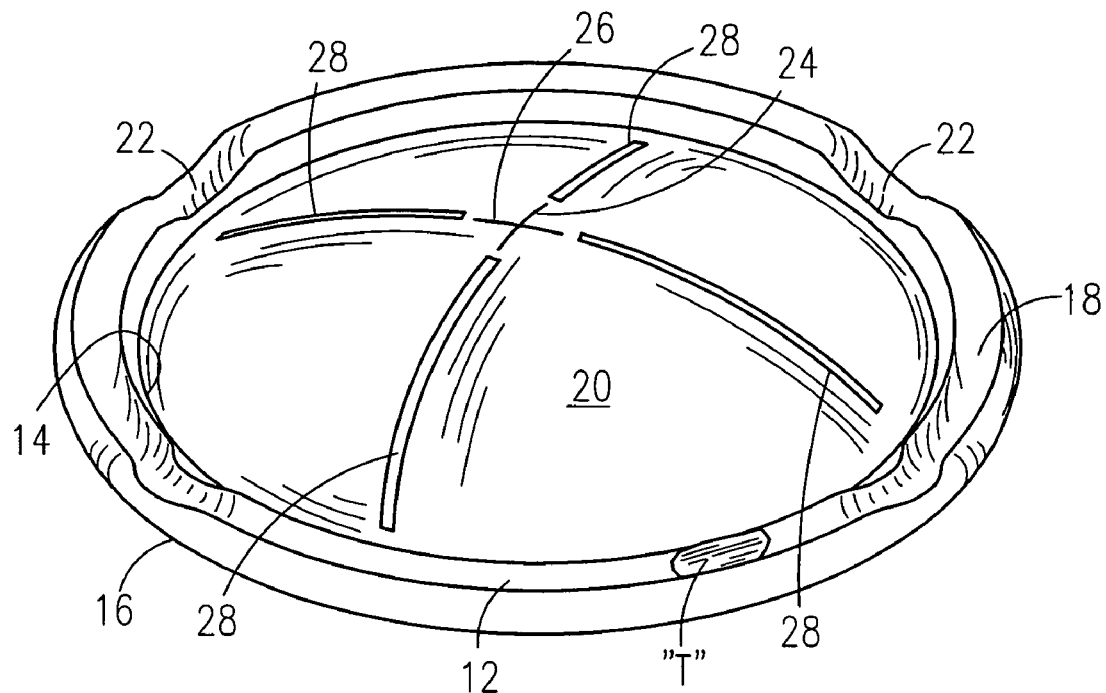
FIG. 2 is a perspective of a disc or discus shaped pet toy for holding consumable pet treats.
Figure 3:
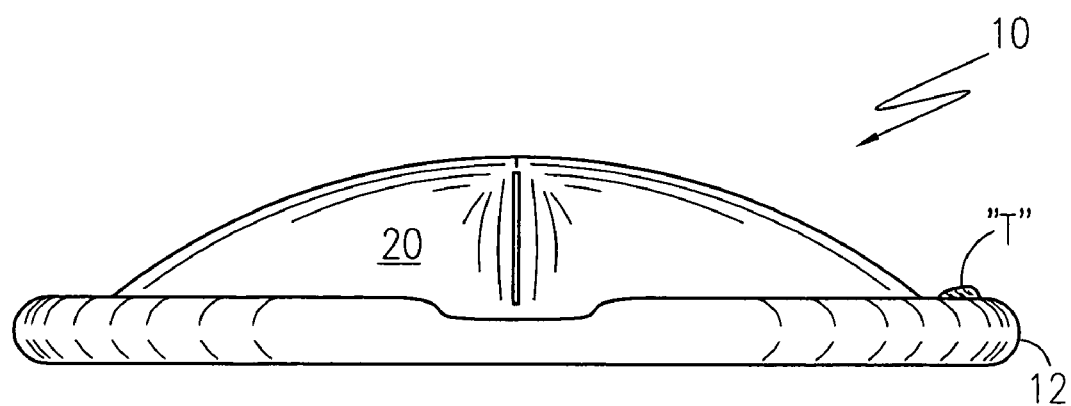
FIG. 3 is a side elevational view of the disc or discuss shaped pet toy of FIG. 2.
Figure 4:
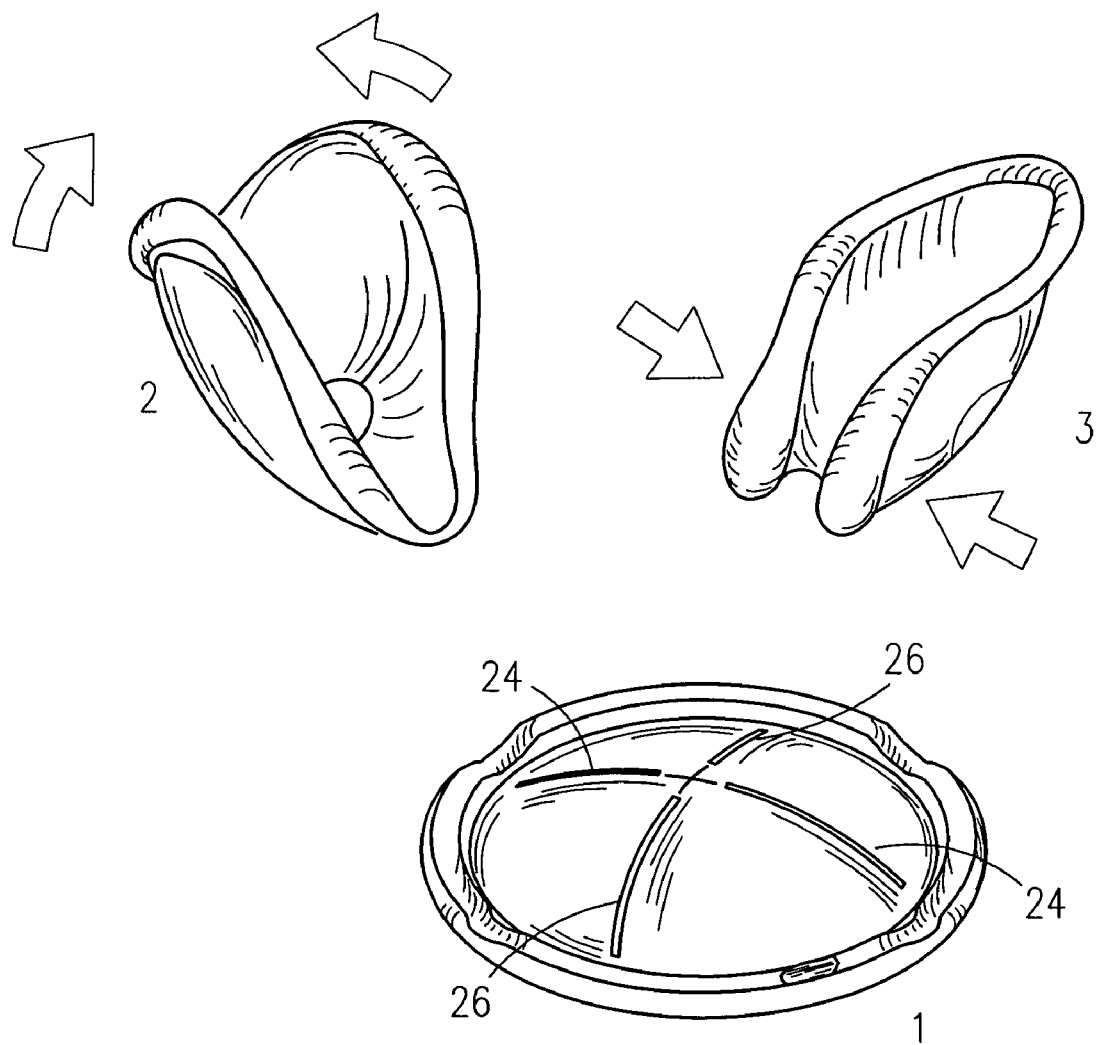
FIG. 4 is a diagramatical sketch of the of the disc or discuss shaped pet toy of FIG. 2 showing the folding and packing of the pet toy 110.

Referring to FIGS. 2-4, a disc or discus shaped pet toy for holding consumable treats 110 is depicted in accordance with a preferred embodiment of the present invention. The toy 110 comprises an annular ring 112 having an inner rib 114 and an outer rib 116, the ribs 114 and 116 forming an interstitial space 18 therebetween for holding a consumable pet treat "T". The inner rib 114 is a single, continuous rib circumscribing the innermost portion of the ring 112. The outer rib 116 is a single, continuous rib circumscribing the outermost portion of the ring 112. The inner rib 114 and outer rib 116 are concentric, with the outer rib 116 having a greater circumferential distance than the inner rib 114. The interstitial space 18 formed between the ribs 114 and 116 is likewise a single, continuous space circumscribing the area between the ribs 114 and 116. The space 18 accommodates the placement of at least one treat "T" and may accommodate a plurality of treats "T" along the circumference of the ring 112. To the inside of the inner rib 114 is a solid central portion 120 traversing or spanning the diameter of the ring 112. In combination the ring 112 and the central portion 120 form a discus shaped toy 110 as depicted. The central portion 120 may be substantially flat or have an elevated profile, such as the curvilinear profile shown in the figures, wherein an apex is formed at the center of the central portion 120. As shown best in conjunction with FIG. 4, the ring 112 may include a plurality of depressions 122 at increments for allowing the toy 110 to fold along axes 124 and 126 (described below). The depressions 122 also allow a user to grasp the toy 110 for throwing or tossing, and further allows a user to insert and/or remove treats "T" to and from the toy 110 in a sliding motion if press fitting is not desirous.

As depicted in FIG. 4, the toy 110 is foldable. The toy 110 has two axes 124 and 126 that bisect the center of the central portion 120 of the toy 110. The axes 124 and 126 have indentations 128 to indicate the axes 124 and 126 and for allowing the toy 110 to fold easily along the axes 124 and 126, respectively.

The toy 110 is preferably manufactured via an injection molding process, or an extrusion molding process, from an elastomeric product (such as thermoset or thermoplastic high tear strength material, thermoplastic elastomers and/or natural rubber). It is envisioned that the toy 110 is manufactured from a material having a specific gravity less than 1.0 so that the toy 110 is buoyant in an aqueous liquid. An aroma, oil or juice may be molded with or impregnated into the material during manufacture, thereby providing olfactory stimulation to the pet. Either separately, or in combination with the consumable treat "T", the aroma, oil or juice functions as an attractant to the pet to engage in chewing, chasing and retrieving exercises.

The toy 110 is envisioned as being adaptable for manufacture directed to variously sized animals, including the various breeds of canines. Thus, the toy 110 may be manufactured in sizes for small breeds, medium size breeds and large breeds, respectively. It is envisioned that the diameters may vary in a range from four inches to twelve inches. Likewise, the toy 110 is envisioned as being manufactured in a variety of colors and/or with a variety of design configurations on the surface of the toy 110.

2. Operation of the Preferred Embodiment

Either embodiment of toy is an effective training device for a pet, especially canines. Using the discus shaped version as an example, the toy 110 may be employed as a retrieval toy that the canine may chase, retrieve and return to the owner. Because of the ribs 114 and 116 and interstitial space 118 provided, consumable treats "T" (such as appropriately proportioned food, kibble or treats) may be inserted therein, thus providing an incentive and reward to retrieve and/or obey commands. By impinging the treats "T" within the ribs 114 and 116 and space 18, the pet must exert energy to retrieve the treats "T", exercise jaw and head muscles, using the teeth and gums, thus the exercise in extracting the treat "T" from the toy 110 exercises muscles of the head and neck, and strengthens teeth and gums, and removes harmful plaque from the teeth and gumlines.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An annular pet toy comprising:
   a disc shaped body having an outer circumference forming an inner rib and a concentric outer rib, said inner rib and said outer rib are single, continuous ribs circumscribing the outermost portion of said circumference with said outer rib having a greater circumferential distance than said inner rib; and
   an interstitial space formed between said inner rib and said outer rib, said interstitial space holds at least one consumable pet treat between said ribs; wherein said interstitial space formed between said ribs is a single, continuous space circumscribing the area between said ribs, said ribs forming a plurality of depressions along said interstitial space to provide a means to both fold and to grasp said toy.

2. The pet toy of claim 1, wherein said toy is manufactured from a material having a specific gravity measure less than 1.0 so that the toy is buoyant in an aqueous liquid.

3. The pet toy of claim 1, wherein an aroma, oil or juice is molded with or impregnated into the material during manufacture thereby providing olfactory stimulation to a pet.

4. The pet toy of claim 1, wherein said toy is manufactured from a process selected from the group comprising injection molding and extrusion molding process.

5. A pet toy comprising:
   a tossable, disc-shaped body having an outer circumference forming a means to hold at least one consumable pet treat; wherein said to hold said at least one consumable pet treat comprises:
   an inner rib and a concentric outer rib;
   an interstitial space formed between said ribs; and
   a plurality of depressions formed on said ribs along said interstitial space to provide a means to both fold and to grasp said toy;
   wherein said interstitial space is said means to hold said at least one consumable pet treat.

* * * * *